United States Patent
Park

(10) Patent No.: US 6,519,215 B1
(45) Date of Patent: Feb. 11, 2003

(54) METHOD AND DEVICE FOR SEARCHING THE FIRST AVAILABLE GOOD SPARE BLOCK OF AN OPTICAL RECORDING MEDIUM

(75) Inventor: Yong Cheol Park, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/388,382

(22) Filed: Sep. 1, 1999

(30) Foreign Application Priority Data

Sep. 7, 1998 (KR) .............................. 98-36824

(51) Int. Cl.[7] ................................. G11B 5/09
(52) U.S. Cl. ..................... 369/47.14; 369/53.17
(58) Field of Search ........................ 369/47.14, 53.12, 369/53.15, 53.17, 53.42, 30.04, 30.07, 30.24, 30.25, 30.36, 32.01, 33.01, 53.16, 124.07

(56) References Cited

U.S. PATENT DOCUMENTS

| | | | | |
|---|---|---|---|---|
| 5,235,585 A | * | 8/1993 | Bish et al. ................... | 369/54 |
| 5,303,219 A | * | 4/1994 | Kulakowski et al. ......... | 369/54 |
| 5,715,221 A | * | 2/1998 | Ito et al. ..................... | 369/54 |
| 6,182,240 B1 | * | 1/2001 | Mine ........................... | 714/5 |
| 6,205,099 B1 | * | 3/2001 | Sasaki et al. ................ | 369/54 |

FOREIGN PATENT DOCUMENTS

EP        541219    *   5/1993     ............... 369/54

* cited by examiner

Primary Examiner—Paul W. Huber
(74) Attorney, Agent, or Firm—Birch, Stewart, Kolasch & Birch, LLP

(57) ABSTRACT

A method and device for searching a first available good spare block from an optical recording medium is disclosed. In the present invention, a first good block in a spare area is determined to be the first available spare block when there is at least one entry to a SDL without an entry of a replacement block assignment. Therefore, the present invention prevents searching a wrong replacement block when SDL entries without replacement block assignment are present.

19 Claims, 12 Drawing Sheets bIkA

METHOD AND DEVICE FOR SEARCHING THE FIRST AVAILABLE GOOD SPARE BLOCK OF AN OPTICAL RECORDING MEDIUM

BACKGROUND OF THE INVENTION

1. Field of the Invention

The present invention relates to an optical recording medium and more particularly to a method and device for searching a first available good spare block from an optical recording medium.

2. Background of the Related Art

An optical storage medium is generally divided into a read only memory (ROM), a write once read many (WORM) memory into which data can be written one time, and rewritable memories into which data can be written several times. Rewritable optical storage mediums, i.e. optical discs, include rewritable compact discs (CD-RW) and rewritable digital versatile discs (DVD-RW, DVD-RAM, DVD+RW).

A repeated recording/playback (R/P) of information to/from rewritable optical disks causes a change in the initial mix ratio of a recording layer formed to record the information on the optical disk. This change degrades the performance of the optical disk, causing errors in the recording/reproduction of information. Namely, the errors due to such degradation show up as defective areas during formatting, recording to and playback from the optical disk. Defective areas of a rewritable optical disk may also be caused by a scratch on its surface, particles of dirt and dust, or errors during manufacture. Therefore, in order to prevent writing into or reading out of a defective area, management of defective areas is necessary.

FIG. 1 shows a defect management area (DMA) in a lead-in area and a lead-out area of a related art optical disc to manage a defect area. Particularly, the data area is divided into a plurality of zones for the defect area management, where each zone is further divided into a user area and a spare area. The user area is where data is actually written and the spare area is used when a defect occurs in the user area.

There are generally four DMAs in one disc, e.g. DVD-RAM, two of which exist in the lead-in area and two exist in the lead-out area. Because managing defective areas is important, the same contents are repeatedly recorded in all four DMAs to protect the data. Each DMA comprises two blocks of 32 sectors, where one block comprises 16 sectors. The first block of the DMA, called a DDS/PDL block, includes a disc definition structure (DDS) and a primary defect list (PDL). The second block of the DMA, called an SDL block, includes a secondary defect list (SDL). The PDL corresponds to a primary defect data storage and the SDL corresponds to a secondary defect data storage.

The PDL generally stores entries of defective sectors caused during the manufacture of the disc or identified when formatting a disc, namely. initializing and re-initializing a disc. Each entry is composed of an entry type and a sector number corresponding to a defective sector. The SDL lists defective areas in block units, thereby storing entries of defective blocks occurring after formatting or defective blocks which could not be stored in the PDL during the formatting. As shown in FIG. 2, each SDL entry has an area for storing a sector number of the first sector of a block having defective sectors, an area for storing a sector number of the first sector of a block replacing the defective block, and reserved areas.

Also, each SDL entry is assigned a value of 1 bit for forced reassignment marking (FRM). A FRM bit value of 0 indicates that a replacement block is assigned and that the assigned block does not have a defect. A FRM bit value of 1 indicates that a replacement block has not been assigned or that the assigned replacement block has a defect. Thus, to record data in a defective block listed as a SDL entry, a new replacement block must be found to record the data. Accordingly, defective areas, i.e. defective sectors or defective blocks, within the data area are replaced with normal or non-defective sectors or blocks by a slipping replacement algorithm and a linear replacement algorithm.

The slipping replacement is utilized when a defective area or sector is recorded in the PDL. As shown in FIG. 3A, if defective sectors m and n, corresponding to sectors in the user area, are recorded in the PDL, such defective sectors are skipped to the next available sector. By replacing the defective sectors by subsequent sectors, data is written to a normal sector. As a result, the user area into which data is written slips and occupies the spare area in the amount equivalent to the skipped defective sectors.

The linear replacement is utilized when a defective block is recorded in the SDL or when a defective block is found during playback. As shown in FIG. 3B, if defective blocks m and n, corresponding to blocks in either the user or spare area, are recorded on the SDL, such defective blocks are replaced by normal blocks in the spare area and the data to be recorded in the defective block are recorded, in an assigned spare area. To achieve the replacement, a physical sector number (PSN) assigned to a defective block remains; while a logical sector number (LSN) is moved to the replacement block along with the data to be recorded. Linear replacement is effective for non real-time processing of data.

If a replacement block listed in the SDL is found to be defective, a direct pointer method is applied to the SDL listing. According to the direct pointer method, the defective replacement block is replaced with a new replacement block and the SDL entry of the defective replacement block is modified into a sector number of the first sector of the new replacement block.

FIG. 4A shows a procedure to manage a defective block found while writing or reading data into or from the user area. FIGS. 4B~4D show embodiments of SDL entries generated according to a related art linear replacement algorithm. Each SDL entry has, in order, a FRM, a sector number of the first sector of the defective block, and a sector number of the first sector of the replacement block.

For example, if the SDL entry is (1, blkA, 0) as shown in FIG. 4B, a defective block has been newly found during the reproduction and is listed in the SDL. This entry indicates that a defect occurs in block blkA and that there is no previously assigned replacement block. The SDL entry is used to prevent data from being written into the defective block in the next recording. Thus, during the next recording, the defective block blka is assigned a replacement block according to the linear replacement.

An SDL entry of (0, blkB, blkE), shown in FIG. 4C; indicates that the assigned replacement block blkE has no defect and data to be written into the defective block blkB in the user area is written into the replacement block blkE in the spare area. An SDL entry of (1, blkC, blkF) shown in FIG. 4D, indicates that a defect occurs in the replacement block blkF of the spare area which replaced the defective block blkC of the user area. In such case, a new replacement block is assigned according to the direct pointer method. If the new replacement block by the direct pointer method is block blkG, the resulting SDL entry would be (0, blkC, blkG) as shown in FIG. 4E.

FIG. 5 is a partial diagram of a related art optical disc recording/playback apparatus relating to the recording operation. The optical disc R/P apparatus includes an optical pickup to write data into and playback data from the optical disc; a servo unit controlling the optical pickup to maintain a certain distance between an object lens of the optical pickup and the optical disc, and to maintain a constant track; a data processor either processing and transferring the input data to the optical pickup, or receiving and processing the data reproduced through the optical pickup; an interface transmitting and receiving data to and from an external host; and a micro processor controlling these components. The interface of the optical disc R/P apparatus is coupled to a host such as a PC, and communicates commands and data with the host.

If there is data to be recorded in an optical disc R/P apparatus, the host sends a recording command to the optical disc R/P. apparatus. The recording command comprises a logical block address (LBA) designating a recording location and a transfer length indicating a size of the data. Subsequently, the host sends the data to be recorded to the optical disc R/P apparatus. Once the data to be written onto an optical disc is received, the optical disc R/P apparatus writes the data starting from the designated LBA. At this time, the optical disc R/P apparatus does not write the data into areas having defects by referring to the PDL and SDL which indicate defective areas of the optical disc.

Referring back to FIG. 4A, the optical disc R/P apparatus skips physical sectors listed in the PDL and replaces the physical blocks listed in the SDL, within the area between A and B, with assigned replacement blocks in the spare area during the recording. If a defective block not listed in the SDL or a block prone to an error is found during the recording or playback, the optical disc R/P apparatus considers such blocks as defective blocks. As a result, the optical disc R/P apparatus searches for a replacement block in the spare area to rewrite the data corresponding to the defective block and lists the first sector's number of the defective block and the first sector's number of the replacement block at the SDL entry.

Therefore, playing an important role in the defective area management, the spare area may be allocated in each zone or group of the data area as in FIG. 1 or may be allocated in a designated portion of the data area. FIG. 6 shows one allocation method in which the spare area is placed at the top of the data area. In such case, the spare area is called a Primary Spare Area (SA-pri). Namely, the data area excluding the primary spare area becomes the user area.

Also, if defective sectors are discovered and registered during the initial or re-formatting, the recording capacity would be proportionately reduced since data cannot be recorded on defective sectors. Therefore, to maintain the initial data recording capacity, a portion of the primary spare area, equivalent to the defective sectors registered on the PDL, slips into the user area. The PSN of the user area to which a value of LSN=0 is assigned varies depending upon the defective sectors registered on the PDL.

Typically, the primary spare area is slipped into the user area in a reverse order as well as the assignment of replacement blocks to the primary spare area in the linear replacement. If the primary spare area becomes full by the slipping or linear replacement, as shown in FIG. 7A, a new spare area may be allocated near the end of the user area. Such new spare area is called a supplementary spare area (SA-sup). If the supplementary spare area becomes full, the allocation of the supplementary spare area may be enlarged as shown in FIG. 7B. The spare blocks in the supplementary spare area is also used in a reverse order during the linear replacement such that the supplementary spare area can be easily enlarged as necessary.

Thus, when a new defective block is found during the recording/playback, or defective blocks which cannot be registered on the PDL is present during the formatting, good blocks which can replace the defective blocks must be located from the allocated spare area. FIG. 8 illustrates an example of a related art process to replace defective blocks during recording/playback when a spare area is allocated in a zone as shown in FIG. 1.

Referring to FIG. 8, a determination is first made whether entries are listed on the SDL (501). If there is no entry listed on the SDL, the block next to the last data block of the user area within the group is determined as the first available good spare block of the group (502). If there are at least one entry listed in the SDL, a search is made in the replacement block storage positions for a block having the highest address value (503) and the block next to the block with the highest address value is determined as the first available good spareblock (504).

For example, if the entries listed on the SDL are as shown in FIGS. 4B, 4C and 4E for an optical disk shown in FIG. 4A, the block having the highest address value recorded in the replacement block storage position would be blkG. Thus, the first available good spare block would be the block next to the last replacement block blkG, i.e., blkH. If a block does not exist next to the last replacement block in the group in question, i.e., there is no more spare blocks left in the group, the foregoing process is repeated for another group.

However, the related art method for searching an available spare block may cause a problem when there are SDL entries, such as (1, blkA, 0) shown in FIG. 9B, without an assigned replacement block because a replacement block has not been assigned for a defective block shown in FIG. 9A. Particularly, a block with the highest address would also be searched since there is at least one entry listed on the SDL. In this case, a sector number of the first sector of the replacement block would be 000000h because only the defective block is listed in the SDL without a replacement block.

Accordingly, a block next to the block with an address value of '0' would be determined as the first available good spare block. Similarly, if the primary spare area is positioned at the top of the data area as shown in FIG. 6, the linear replacement is performed in a reverse order and a block prior to the block with an address value of '0' would be determined as the first available good spare block when there is a SDL entry without a replacement block. However, the data area starts from the sector 31000h and the first available good spare block would be at a wrong position, neither in the user area nor in the spare area. Thus, a replacement block for a defective block would not be assigned correctly and data would be recorded at a wrong position, if at all, causing errors during playback.

SUMMARY OF THE INVENTION

Accordingly, an object of the present invention is to solve at least the problems and disadvantages of the related art.

An object of the present invention is to effectively search for a first available good spare block from an optical recording medium. Thus, an object of the present invention is to accurately locate the first available good spare block when a SDL entry does not have assigned replacement blocks.

Another object of the present invention is to determine a first used block in the spare area as the first available good spare block when a SDL entry does not have assigned replacement blocks.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a method of searching for a first available good spare block in an optical recording medium having a SDL according to the present invention includes (1) determining a presence of an assigned replacement block entry when there is at least one SDL entry; and (2) determining a first good block of the spare area as the available good spare block if there are no assigned replacement block entries in the step (1).

Step (2) includes determining a good block next to the last data block of a user area as the first available good spare block when the spare area follows the user area. Moreover, step (2) includes determining a good block in the spare area immediately prior to the first data block of the user area as the first available good spare block when the user area follows the spare area.

A device for searching a first available good spare block from an optical recording medium having an SDL according to the present invention, includes a determinator determining a presence of an assigned replacement block entry when there is at least one SDL entry; and a replacement block determinator determining a first good block of a spare area as the available good spare block if there are no assigned replacement block entries.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Reference will now be made in detail to the preferred embodiments of the present invention, examples of which are illustrated in the accompanying drawings. If a defective block is newly found during recording/playback, or if there are defective blocks which cannot be listed on a PDL during formatting, good spare blocks which can replace such defective blocks are searched. To search for a first good spare block according to the present invention, a determination is made whether an assigned replacement block entry is present when there is at least one SDL entry. Subsequently, a first good block of the spare area is determined as the available good spare block if there are no assigned replacement block entries.

Figure 10:
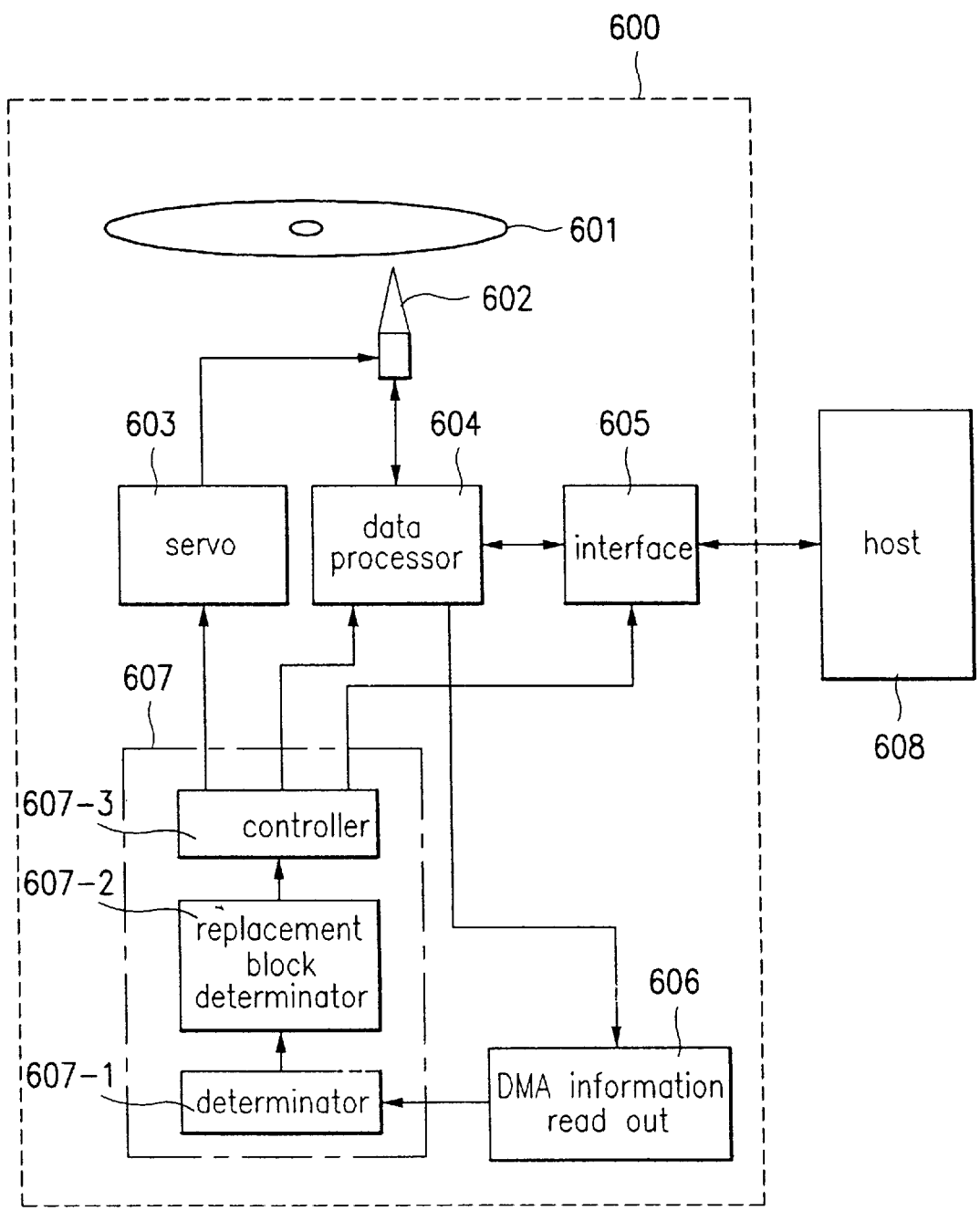
FIG. 10 is a block diagram of a system for recording/playback of data on an optical disk in accordance with the present invention.

Referring to FIG. 10, the device 600 for R/P of data on an optical disk includes an optical pickup 602 recording/playing back data to/from an optical disk 601; a servo 603 controlling the optical pickup 602 to maintain a distance between an object lens and the optical disk 601, and to track a fixed track; a data processor 604 receiving and processing data, and sending the processed data to the optical pickup 602; a DMA information read out 606 reading out information registered in a DMA area of the optical disk through the data processor 604; an interface 605 exchanging data with an external host 608; and a microcomputer 607 controlling elements 601~606.

As shown, the interface 605 is connected to the host 608 to exchange commands and data. The microcomputer 607 checks for a presence of entries listed on a SDL utilizing the information from the DMA information read out 606 in order to search for an available spare area. If there are SDL entries, the controller 607 further checks for a presence of assigned replacement block entries. Subsequently, a first good block of the spare area is determined by the controller 607 as an available spare block if there are no assigned replacement block entries. Subsequently, the controller 607 controls the linear replacement such that an appropriate replacement block is utilized.

Moreover, the microcomputer 607 may be divided into a determinator 607-1, a replacement block determinator 607-2, and a controller 607-3. Namely, the determinator 607-1 checks the presence of entries listed on a SDL utilizing the information from the DMA information read out 606 in order to search for an available spare area. If there are SDL entries, the determinator 607-1 also determines the presence of assigned replacement block entries. The replacement block determinator 607-2 determines a first good block of the spare area as an available spare block if there are no assigned replacement block entries as determined by the determinator 607. The controller 607-3 controls the linear replacement such that a replacement block determined by the replacement block determinator 607-2 is utilized.

Figure 1:
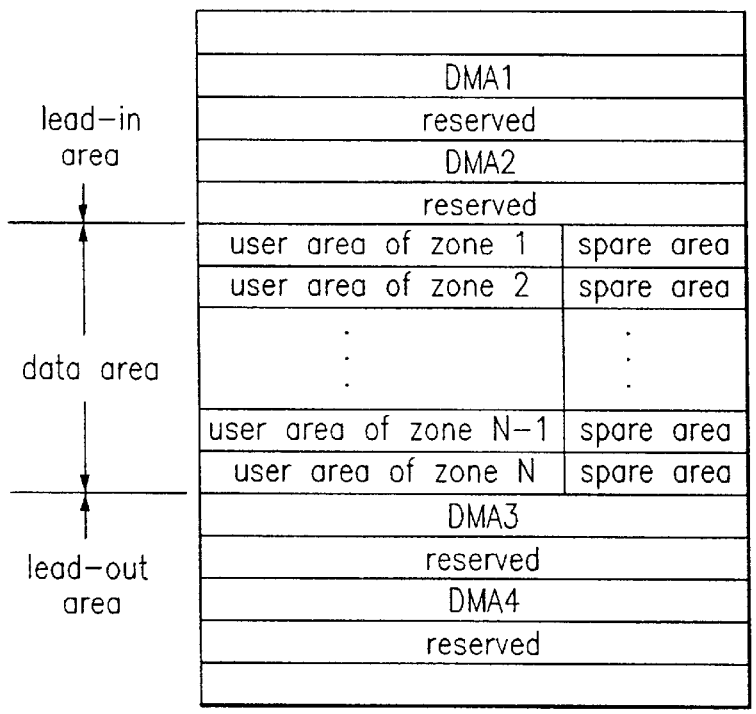
FIG. 1 illustrates a data area of an optical disk.
Figure 2:
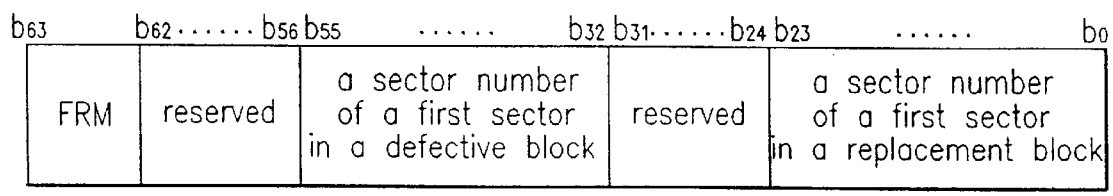
FIG. 2 illustrates a structure of SDL entries.
Figure 3A:
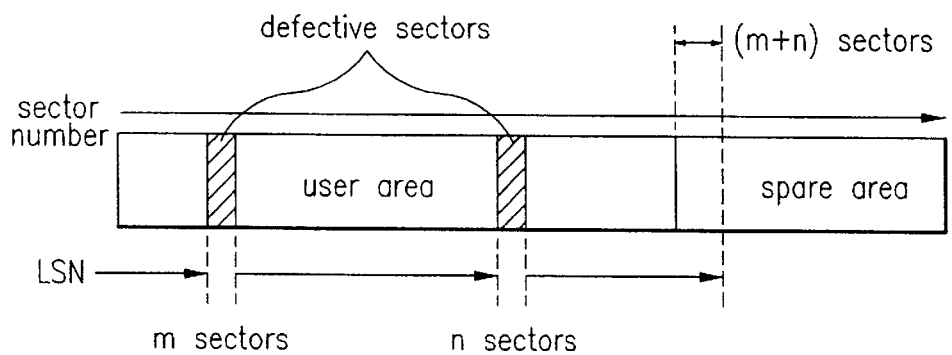
FIG. 3A illustrates a slipping replacement.
Figure 3B:
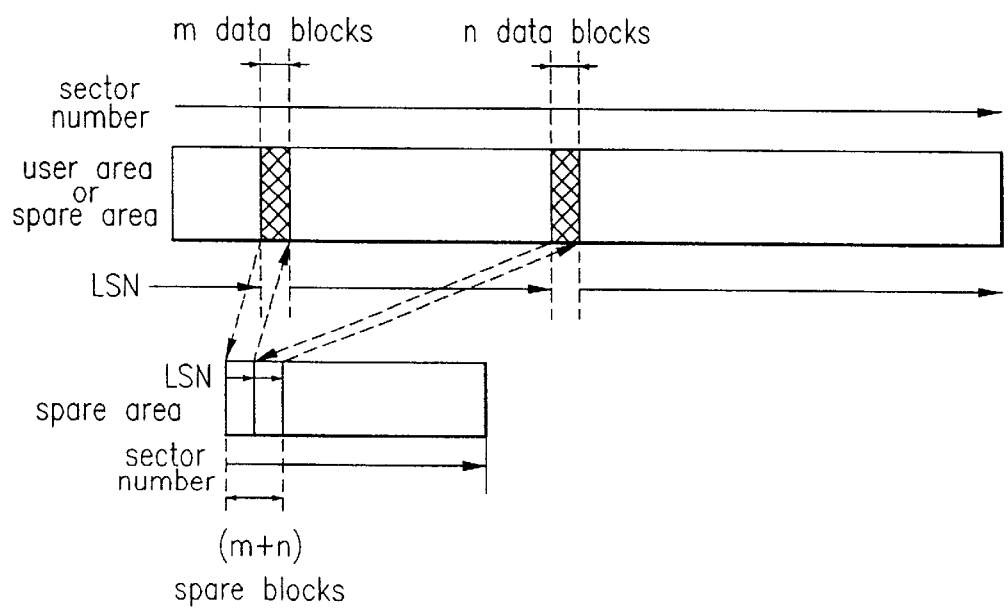
FIG. 3B illustrates a linear replacement.
Figure 4A:
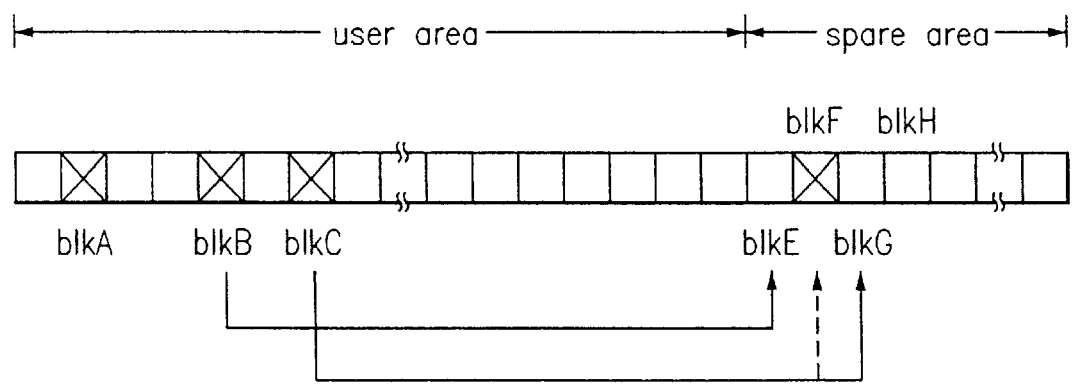
FIG. 4A illustrates data recording on an optical disk using an SDL and FIGS. 4B–4E illustrate examples showing information on defective blocks listed on an SDL.
Figure 4B:
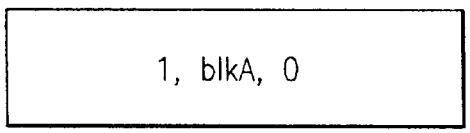
Figure 4C:
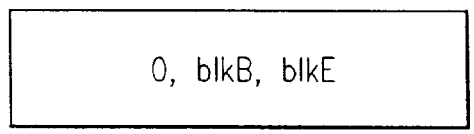
Figure 4D:
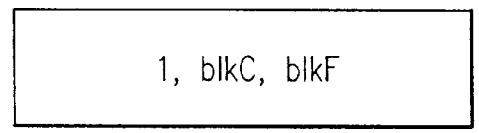
Figure 4E:
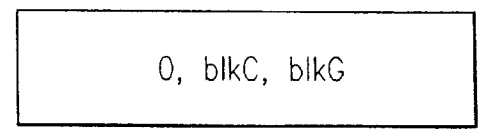
Figure 5:
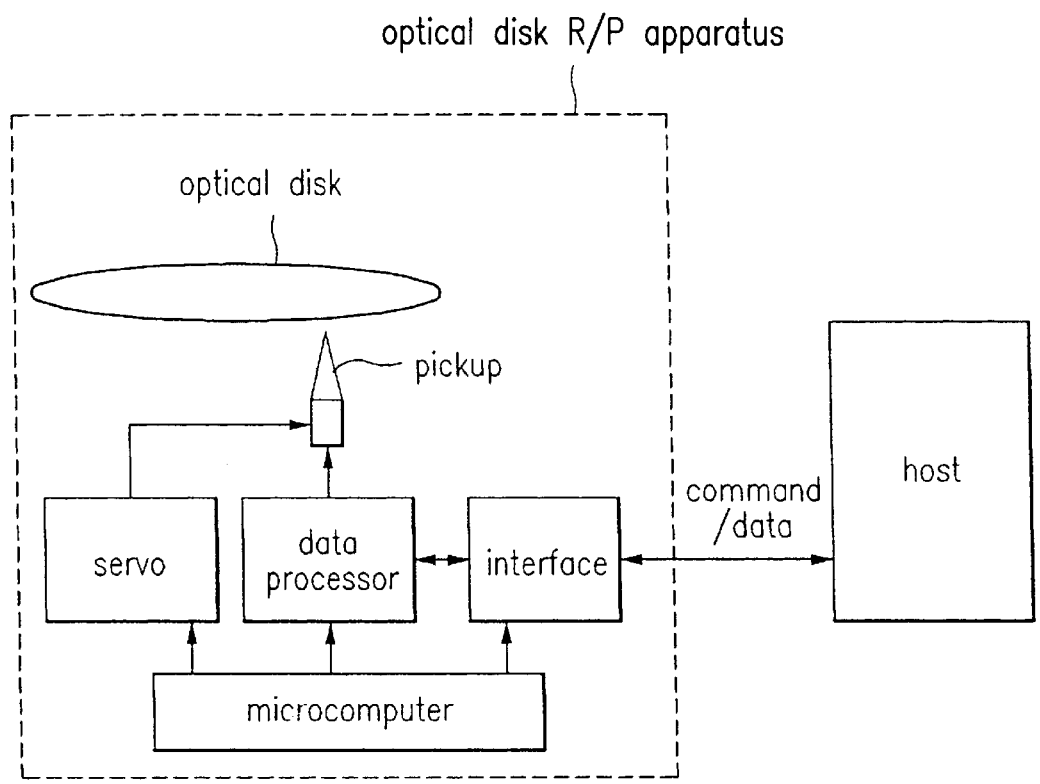
FIG. 5 is a block diagram of a system in the related art for recording/playback of a data on an optical disk.
Figure 11:
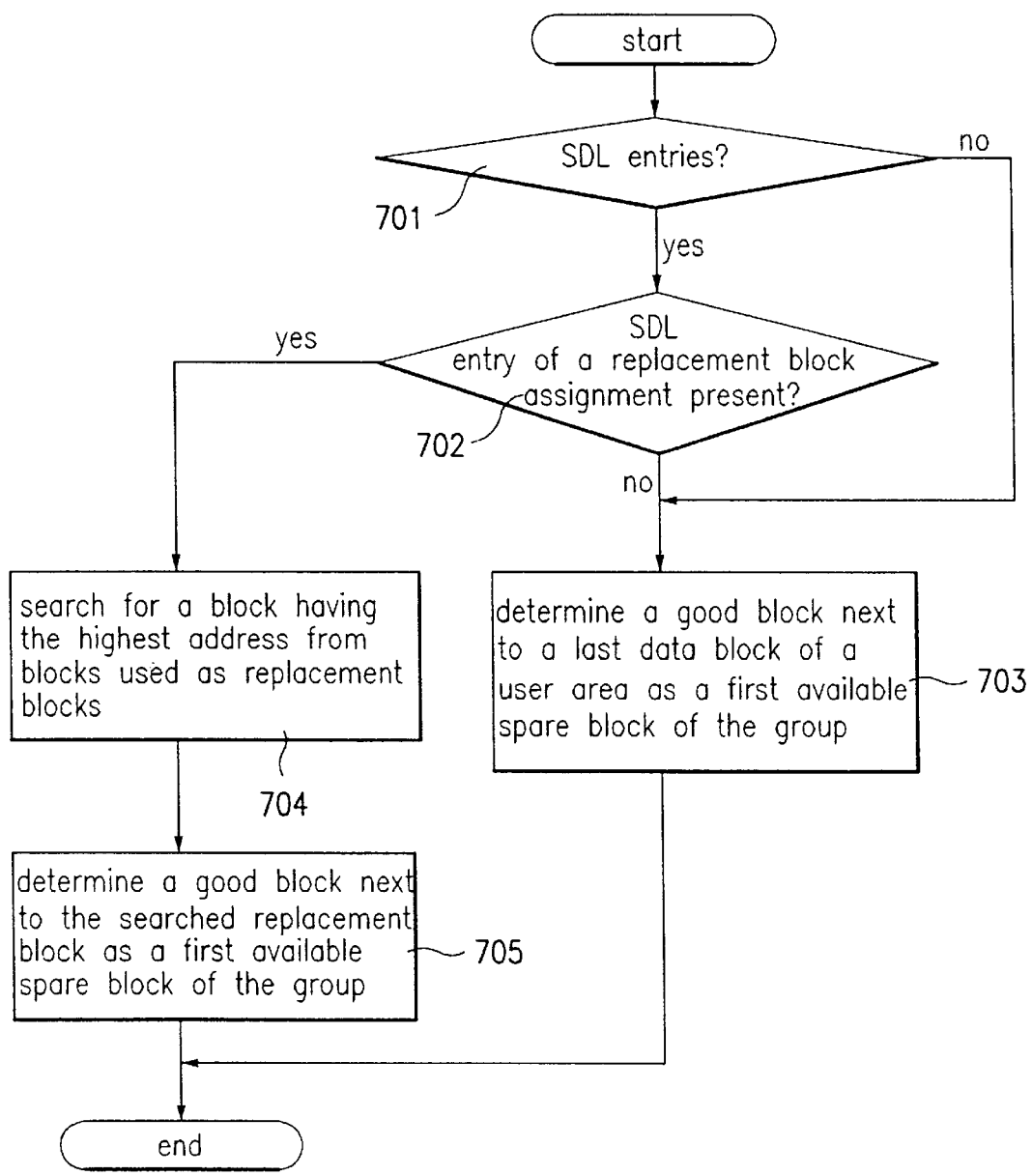
FIG. 11 is a flow chart showing a method for searching an available spare block from an optical disk in accordance with a first embodiment of the present invention.

FIG. 11 shows a method for searching an available spare block from an optical disk in accordance with a first embodiment of the present invention. This embodiment is applicable when the spare area is allocated in each zone as shown in FIG. 1. An explanation of the present method will be explained with reference to FIGS. 10 and 11.

When a defective block is newly found during R/P, or if there are defective blocks which cannot be listed on a PDL during formatting, good spare blocks which can replace the defective blocks are searched. Thus, the DMA information read out 606 reads the information stored in a DMA through the data processor 604. Utilizing the read information, the determinator 607-1 determines whether there is at least one SDL entry in the DMA (701). If it is determined that there is no entry listed on the SDL in step 701, the replacement block determinator 607-2 determines a good block next to a last data block of a user area in the group as a first available good spare block of the group (703).

If it is determined in step 701 that there is at least one entry listed on the SDL, a further determination is made to check for a presence of a SDL entry of a replacement block assignment (702). If it is determined in step 702 that there is no SDL entry of a replacement block assignment, a SDL entry without replacement block assignment is present, such as the SDL entry (1, blkA, 0). Accordingly, a sector number of the first sector of a replacement block is disregarded. Namely, rather than determining the first sector number of the first sector of a replacement block as the first available spare block, a good block next to the last data block of a user area in the group is determined as the first available spare block of the group (703).

If it is determined in step 702 that an SDL entry of a replacement block assignment is present, a search is made in the replacement block storage positions for a block having the highest address value (704) and the block next to the block with the highest address value is determined as the first available good spare block (705). If it is determined in step 703 or 705 that there are no more available spare blocks in the group in question, the aforementioned process is repeated for another group.

Figure 6:
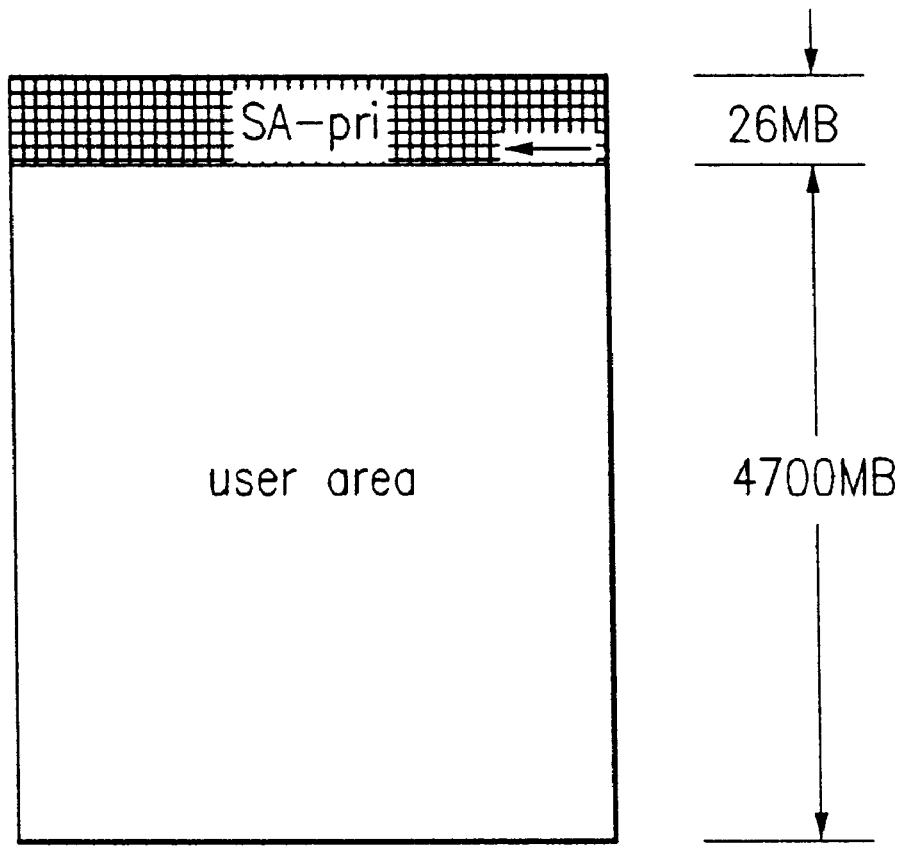
FIG. 6 illustrates a spare area allocated at a top position of a data area.
Figures 7A, 7B:
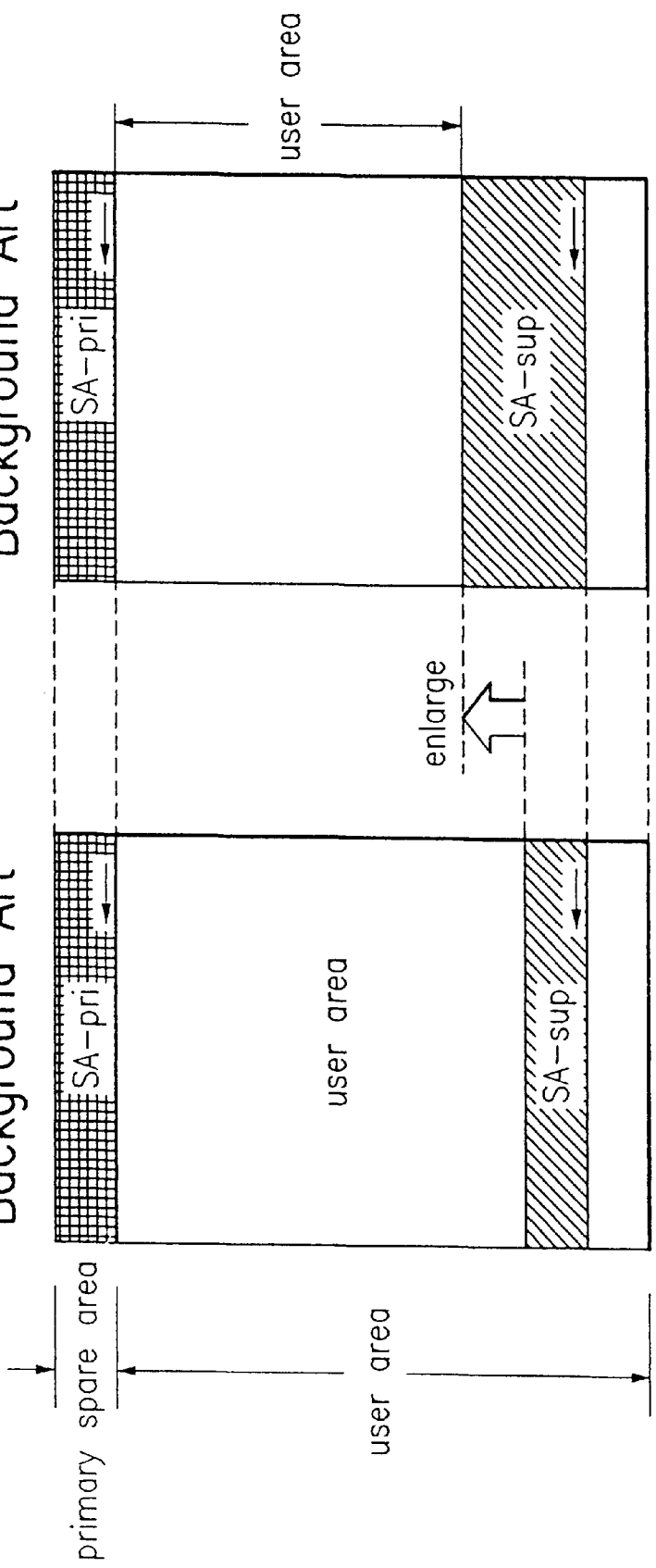
FIGS. 7A and 7B illustrate examples showing a supplementary spare area allocated to a disk with a primary spare area and an enlargement of the supplementary spare area.
Figure 8:
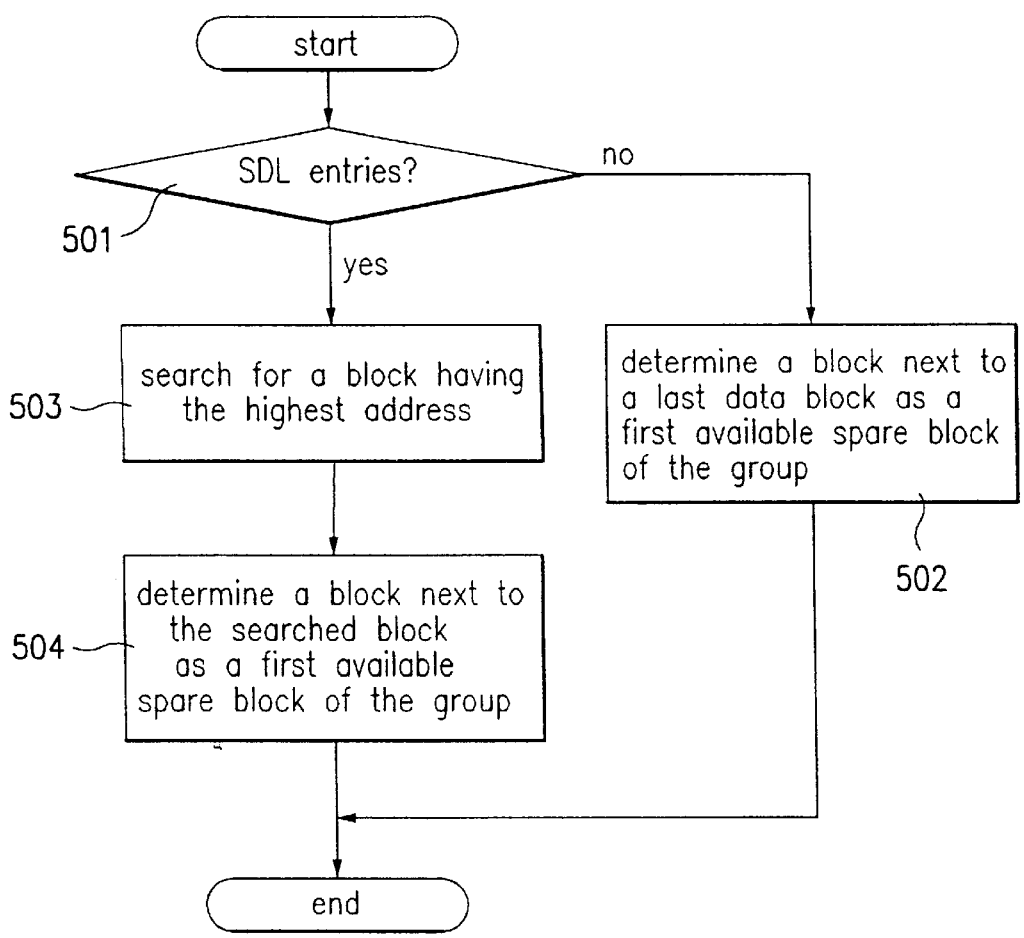
FIG. 8 is a flow chart showing a method in the related art for searching an available spare block from an optical disk.
Figure 9A:
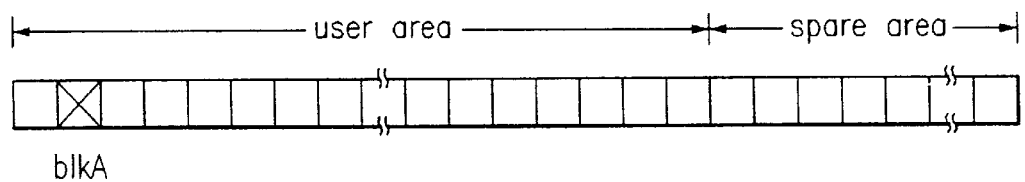
FIG. 9A illustrates a status when a replacement block is not assigned to a defective block in an optical disk.
Figure 9B:
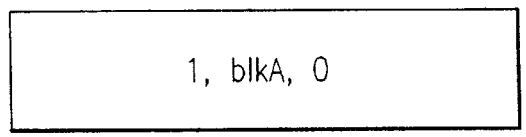
FIG. 9B illustrates a SDL entry for the defective block in FIG. 9A.
Figure 12:
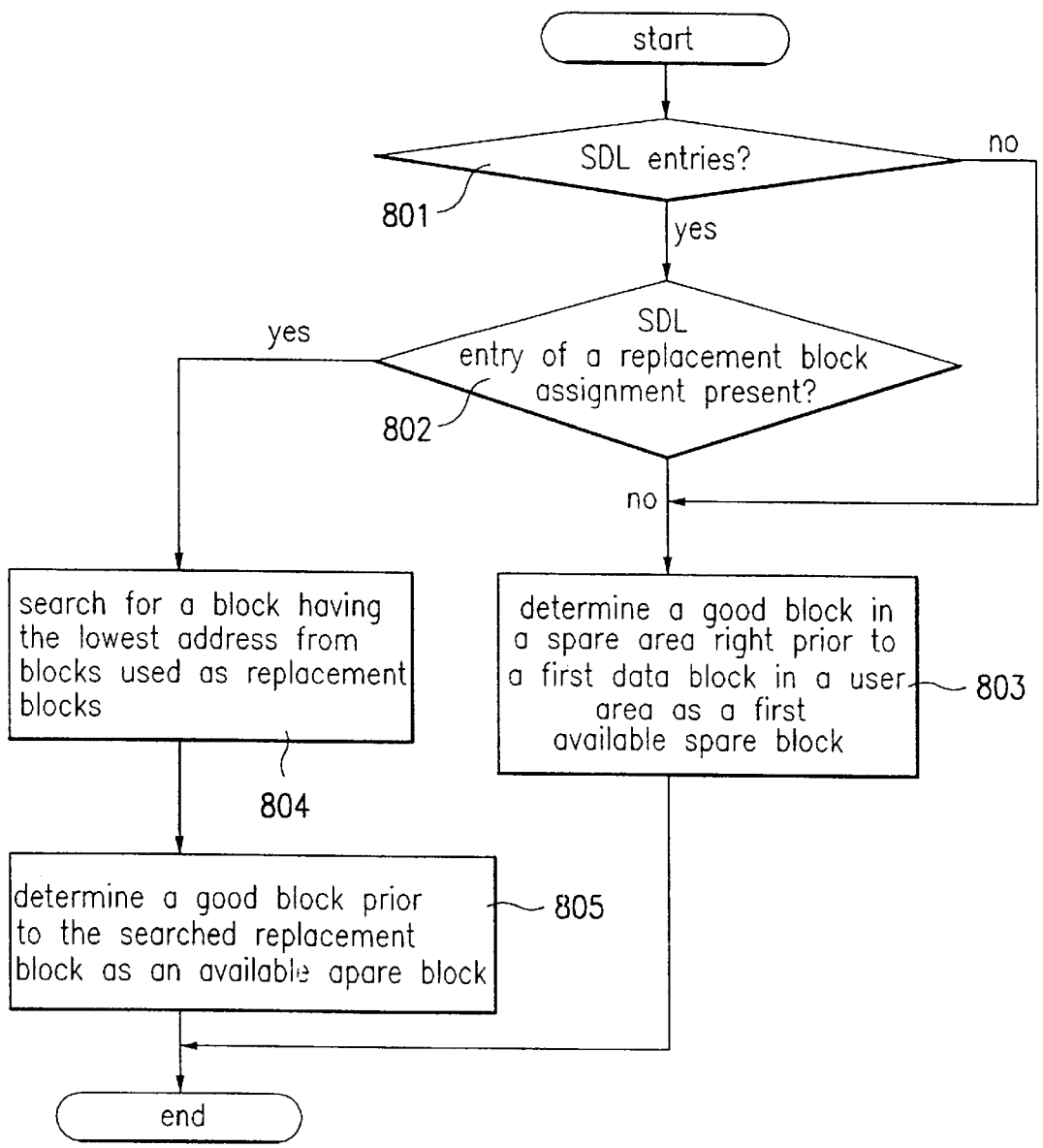
FIG. 12 is a flow chart showing a method for searching an available spare block from an optical disk in accordance with a second embodiment of the present invention.

FIG. 12 shows a method for searching an available spare block from an optical disk in accordance with a second embodiment of the present invention. This embodiment is applicable when a primary spare area is assigned to a top of a data area as shown in FIG. 6. An explanation of the present method will be explained with reference to FIGS. 10 and 12.

When a defective block is found during R/P, or defective blocks are present which cannot be listed on a PDL in formatting, the determinator 607-1 checks for a presence of at least one entry listed on the SDL (801). If it is determined in step 801 that there is no SDL entry, the replacement block determinator 607-2 determines a first block of the primary spare area as an available spare block (803).

If it is determined in step 801 that there is at least one SDL entry, a further determination is made to check for a presence of an SDL entry of a replacement block assignment (802). If it is determined in step 802 that there is no SDL entry of a replacement block assignment, a SDL entry without a replacement block assignment is present. Thus, a sector number of the first sector of the replacement block is disregarded as a first available spare block. Instead, a first block of the primary spare area is determined to be the first available spare block (803). For a primary spare area allocated at the top of the user area, the slipping and linear replacements are conducted in a reverse sequence. Accordingly, a good block of the spare area immediately prior to a first data block of the user area is determined to be the first available spare block in step 803.

If it is determined in step 802 that an SDL entry of a replacement block assignment is present, a search is made in the replacement block storage positions for a block having the lowest address value (804) and a good block immediately prior to the block with the lowest address value is determined as the first available good spare block (805). Also, if it is determined in step 803 or 805 that there are no more available spare blocks in the primary spare area, the aforementioned process is repeated for the supplementary spare area.

Therefore, the present invention for searching a first available good spare block from an optical recording medium allows an accurate determination of the first available spare block even if there are no entries for replacement block assignment on a SDL. Disregarding a first sector number of a replacement block in a SDL entry, a first block of a spare area is determined as an available spare block when the SDL has no entries of replacement block assignment. Accordingly, the assignment of replacement blocks can be accurately and efficiently made for defective blocks, thereby allowing a better recording/playback of data.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for searching a first available good spare block from an optical recording medium with a defect list, said method comprising:
   (a) determining if there is at least one entry to said defect list;
   (b) determining if said at least one entry is with a replacement block assignment or without a replacement bock assignment if it is determined in said (a) that there is at least one entry to said defect list, said replacement block assignment indicating assignment of a replacement block for a defective block;
   (c) determining, if it is determined in said (b) that there is no replacement block assignment in any of said at least one entry, that a first good block of a spare area is a first available spare bock; and
   (d) determining, if it is determined in said (b) that there is at least one entry with a replacement block assignment, a first available spare block by considering said replacement block assignment.

2. A method of claim 1, wherein said spare area is allocated in each zone of a data area such that said spare area follows a user area, and wherein said (a), (b), (c) and (d) are executed for a first zone of the data area.

3. A method of claim 2, wherein said (c) determines a good block next to a last data block of the user area as a first available spare block of the first zone.

4. A method of claim 2, wherein said (d) includes:
   (d1) searching for a block having a highest address value from replacement block storage positions if it is determined in said (b) that there is at least one entry with a replacement block assignment; and then
   (d2) determining a block next to said block having the highest address value as a first available spare block of the first zone.

5. A method of claim 2, further comprising:
   (e) determining a good block next to a last data block of the user area as a first available spare block of the first zone if it is determined in said (a) that there is no entry listed in the defect list.

6. A method of claim 2, further comprising:
   repeating said (a), (b), (c) and (d) for a second zone of the data area if there are no available spare blocks in the first zone.

7. A method of claim 1, wherein in said (c), said spare area is allocated as a primary spare area in a data area.

8. A method of claim 7, wherein said (c) determines a first good block prior to a first data block in a user area as a first available spare block.

9. A method of claim 1, wherein said (d) includes:
   (d3) searching for a block having a lowest address value from replacement block storage positions if it is determined in said (b) that there is at least one entry with a replacement block assignment; and
   (d4) determining a block immediately prior to said block having the lowest address value as a first available spare block.

10. A method of claim 1, further comprising:
    (f) determining a first block of a primary spare area as a first available spare block if it is determined in said (a) that there is no entry listed in the defect list.

11. A device for searching a first available spare block from an optical recording medium with a defect list, the device comprising:
    a defect management information reading unit reading information registered in a defect management area of the optical recording medium; and
    a microcomputer, by utilizing the information from the defect management information reading unit, determining if there is at least one entry to said defect list, determining if said at least one entry is with a replacement block assignment or without a replacement block assignment if the microcomputer determines that there is at least one entry to said defect list, and determining a first good block of a data area as an available spare block if it is determined that there is no replacement block assignment in any of said at least one entry, said replacement block assignment indicating assignment of a replacement block for a defective block.

12. A device of claim 11, wherein said microcomputer comprises:
    a determinator determining if there is at least one entry to the defect list by utilizing the defect management information, and determining if said at least one entry is with a replacement block assignment or without a replacement block assignment if there is at least one entry to the defect list; and
    a replacement block determinator determining a first good block of the data area as an available spare block if there is no replacement block assignment in any of said at least one entry, as determined by the determinator.

13. A device of claim 12, wherein said microcomputer further comprises:
    a controller controlling a linear replacement such that said available spare block is utilized as a replacement block.

14. A device of claim 12, wherein said data area includes a plurality of zones, each zone including a user area followed by a spare area.

15. A device of claim 14, wherein the replacement block determinator determines a good block next to a last data block of the user area of a zone as a first available spare block of the zone, if there is no entry listed in the defect list or if said at least one entry is without a replacement block assignment as determined by the determinator.

16. A device of claim 14, wherein the replacement block determinator searches for a block having a highest address value from replacement block storage positions if it is determined by the determinator that said at least one entry is with a replacement block assignment, and wherein the replacement block determinator determines a block next to said block having the highest address value as a first available spare block of a zone.

17. A device of claim 12, wherein said replacement block determinator determines a first good block of a primary spare area in the data area as the available spare block if there is no replacement block assignment in any of said at least one entry.

18. A device of claim 17, wherein the replacement block determinator determines a first block of said primary spare area as a first available spare block, if there is no entry listed in the defect list or if there is no replacement block assignment in any of said at least one entry as determined by the determinator.

19. A device of claim 12, wherein the replacement block determinator searches for a block having a lowest address value from replacement block storage positions if it is determined by the determinator that said at least one entry is with a replacement block assignment, and determines a block immediately prior to said block having the lowest address value as a first available spare block.

* * * * *